United States Patent

Sumikama

[15] 3,680,374
[45] Aug. 1, 1972

[54] HEAT FLOW METER
[72] Inventor: Sadao Sumikama, Yokohama, Japan
[73] Assignee: Showa Denko K.K., Minato-ku, Tokyo, Japan
[22] Filed: Sept. 24, 1970
[21] Appl. No.: 75,230

[30] Foreign Application Priority Data
Sept. 24, 1969 Japan..........................44/75298

[52] U.S. Cl..............................................73/190 H
[51] Int. Cl................................................G01k 17/00
[58] Field of Search........73/190, 341; 136/213, 216, 136/224

[56] References Cited
UNITED STATES PATENTS

| | | | |
|---|---|---|---|
| 2,897,485 | 7/1959 | Johnson | 136/224 |
| 1,528,383 | 3/1925 | Schmidt | 73/341 |
| 2,429,200 | 10/1947 | Bradley et al. | 136/224 |
| 3,238,775 | 3/1966 | Watts | 73/190 |
| 3,285,069 | 11/1966 | Weiss | 136/213 |
| 3,436,274 | 4/1969 | Villers | 136/224 |

*Primary Examiner*—Richard C. Queisser
*Assistant Examiner*—Herbert Goldstein
*Attorney*—Kemon, Palmer & Estabrook

[57] ABSTRACT

A heat flow meter so arranged that a temperature measuring body is provided adjacent to thin plates having layers of thermally resistant material and equally thick layers of good heat conducting material provided in the same levels as those of said thermally resistant body layers and can measure the difference between the temperature drop through the thermally resistant layer and that through the good heat conducting layer when heat current passes through the two layers.

6 Claims, 4 Drawing Figures

INVENTOR.
SADAO SUMIKAMA
BY
Kenyon, Palmer & Estabrook

HEAT FLOW METER

The present invention relates to a heat flow meter for measuring with excellent accuracy the thermal current passing through the surface or inside of a body or a powdery body.

Generally speaking, the quantity of heat radiated from the surface of a body may be determined by measuring the temperature difference between the two surfaces of a thermally resistant plate having sufficiently small thickness and placed on the heat radiating surface perpendicularly to the flow of heat. Likewise, the quantity of heat flowing inside of a powdery body, etc. may be determined by measuring the temperature difference between the two surfaces of a similar thin thermally resistant plate placed inside the powdery body and perpendicularly to the flow of heat.

In these methods of measuring, however, temperature measuring bodies must be closely attached to the two surfaces of the thin thermally resistant plate. The construction of such a measuring device is complicated due to this requirement and restricted from the viewpoint of mechanical strength, for instance. This is one reason that has prevented the development of a practical heat flow meter. For example, in case a thermocouple formed by vacuum plating of metal is used, the two surfaces are vacuum-plated at least twice. Further, the thermocouples on the two surfaces must be connected through the thermally resistant plate when the vacuum-plated thermocouples are connected into a temperature measuring instrument of different type, for measuring the difference of the temperatures. In the above case, the construction of the temperature measuring device is very complicated, making the use of the device impracticable.

It is also necessary that the thermally resistant body has a certain amount of mechanical strength in order to arrange and connect the temperature measuring body on both sides of the thermally resistant plate. Therefore, material for a heat resisting plate must be thin but still have sufficient mechanical strength. Accordingly, the material for a thermally resistant plate is practically limited to a few materials such as mica, and it is inevitable to some extent that the thermal turbulence occurs in the measured body when the thermal resistant plate is mounted, since the thickness of said plate can not be made extremely thin.

The present invention has as its object providing a heat flow meter capable of measuring with good accuracy the quantity of heat radiated from the surface or flowing through the inside of the body to be measured. This object is achieved by utilizing thin plates having layers of thermally resistant material and equally thick layers of good heat conducting material provided in the same levels as those of thermally resistant body layers, and a temperature measuring means provided adjacent to such plates for measuring the difference between the temperature drop through the thermally resistant layer and that through the good heat conducting layer when heat current passes through the two layers.

The advantages of a heat flow meter according to this invention are that it is easy to fabricate and has uniform characteristics with good accuracy.

The present invention can be more fully understood from the following detailed description when read in conjunction with the accompanying drawing, in which.

Figure 1:
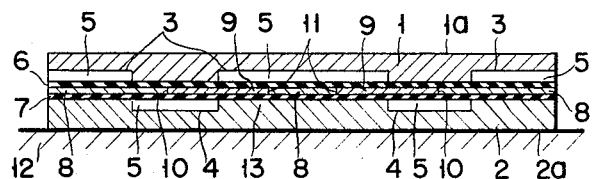
FIG. 1 is a cross-section schematic view of one embodiment of a heat flow meter according to the present invention.

Heat flow meters of the present invention will be explained with respect to embodiments shown in the drawing.

The dimension of thickness of the device shown in FIG. 1 is much exaggerated compared with the actual dimension to facilitate the following description understood.

In FIG. 1, the reference numerals 1 and 2 denote thin plates having good thermal conductivity and consist of a metal such as copper, aluminum, or zinc, or their alloy; on one surface of each plate, shallow depressions 3 and 4 are provided locally by chemical etching such as photo-etching. The depressed surfaces of the thin plates 1 and 2 having the depressions are set to face each other and so arranged that the depressions 3 of the thin plate 1 and the depressions 4 of the thin plate 2 are positioned alternately. The depressions 3 and 4 are filled with a proper thermally resistant material 5. When air is used as the thermally resistant material, nothing else is needed to fill the depression. Mechanical strength is not demanded particularly of the thermally resistant material used as a filling, and a variety of solids or powders may be used depending on the applications.

Between the oppositely disposed thin plates 1 and 2 are inserted electrically insulating layers 6 and 7 such as thin aluminum plates electrically insulated over their surfaces by anodic oxidation or mica. Over said electrically insulated thin aluminum or mica plates are provided a group of thin thermocouples in series, connected in differential, and formed of Alumel alloy 8 and Chromel alloy 9 by such a process as vacuum plating. If required, a foil-form thermocouple may be used in this case.

In any case, all thermosensitive portions of a thin group of thermocouples are disposed in the same plane. Each temperature sensing point 10 or 11 of the thermocouple group is disposed to form a pair over the area extending from the thermally resistant body layer 5 formed in the depression to the good thermally conducting body layer or metal layer 13.

It is now assumed that the metal plates 1 and 2 are equal in thickness and the depressions 3 and 4 are also equal in depth. Denoting the quantity of flow of heat per unit area by Q, the heat resistance of the metal plates by $R_m$, and the heat resistance of the thermal resistant body by $R_r$, let us consider the temperature difference $\Delta T$ arising between a set of differential thermocouples, i.e., between the temperature sensing points 10 and 11 when the heat flow meter is placed on the body 12 to be measured. At the temperature sensing point 10, the heat current from the measured body 12 passes through the thermally resistant material 5 of the thin plate 2 to transmit heat; at the temperature sensing point 11, the heat current does not pass through such a thermally resistant body layer 5 but passes merely through the metal layer 13 to transmit heat. Thus the temperature difference $\Delta T$ arises between the temperature sensing points 10 and 11. In other words, in case the heat current passes through a metal layer and thermally resistant body layer each equal in depth to the depression 4, the temperature drop arising perpendicularly to the measured body between the two surfaces of metal layer 13 is not equal to that arising perpendicularly to the measured body between the two surfaces of thermal resistant body layer 5, the difference being $\Delta T$. The following simple equation naturally holds, since the metal layer 13 and the thermally resistant body layer 5 are always equal in depth.

$$\Delta T = Q(R_r - R_m)d \quad (1)$$

where $d$ represents the depth of the depression 4.

$R_R \gg R_m$, hence from the equation (1)

$$\Delta T = QR_r d \quad (2)$$

In case that $d$ and $R_r$ are almost independent of temperature, the following simple proportional expression is further obtained.

$$\Delta T \alpha Q \quad (3)$$

Therefore, $Q$ can easily be calculated from $\Delta T$ according to the equation (3).

In the above heat flow meter according to this invention, the main body consists of thin plate of metal or alloy having good thermal conductivity and the thermally resistant body is composed of a substance filled in a very shallow depression, thereby minimizing to the utmost the thermal turbulence of the measured body due to the installation of a heat flow meter.

That portion of the thin plate 1 facing the thermally resistant layer 5 provided in the thin plate 2 is a metallic layer, and that portion of the thin plate 1 facing the metallic layer 13 adjacent to the thermally resistant layer 5 is a thermally resistant layer. Therefore, the heat resistance between the lower face 2a of the thin plate 2 and the upper face 1a of the thin plate 1 is equal at any part. Consequently, the heat current from the measured body 12 is transmitted evenly over the upper face 1a of the thin plate 1 and there is no temperature difference at any part of the surface 1a. As a result, no turbulence occurs in the heat current flowing in the heat flow meter and measurements can be made with good accuracy.

Furthermore, upon forming the above-mentioned depressions 3 and 4, the technique of photo-etching is employed, making it possible for the depressions to be as shallow as several tens to several hundred microns with good accuracy and thereby to reduce the fluctuation of the quality characteristic of each heat flow meter. Since all temperature sensing portions of thermocouples are located on the same plane, only two plating operations are required even vacuum plating, for instance, and troublesome connections are not necessary; thus, this heat flow meter is simple, handy, and practical.

Figure 2:
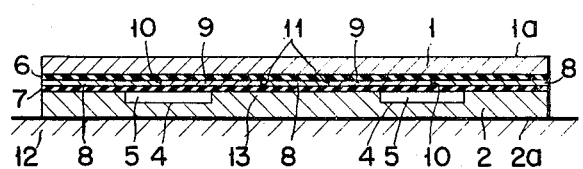
FIG. 2 is a view similar to FIG. 1 showing another embodiment of a heat flow meter according to the present invention.

FIG. 2 shows a simplified type of the heat flow meter according to this invention. Depressions 4 are provided only in a thin metal plate 2 of good thermal conductivity but not in the other thin plate 1. The reference numerals in FIG. 2 identical with those in FIG. 1 denote similar parts. In this simplified type of heat flow meter, there occurs turbulence to some degree in the heat current flowing in the heat flow meter, and the accuracy and temperature characteristics are therefore somewhat inferior to the one shown in FIG. 1. However, a heat flow meter of this type may be put to practical use if the total thickness of the plates is sufficiently small.

Figure 3:
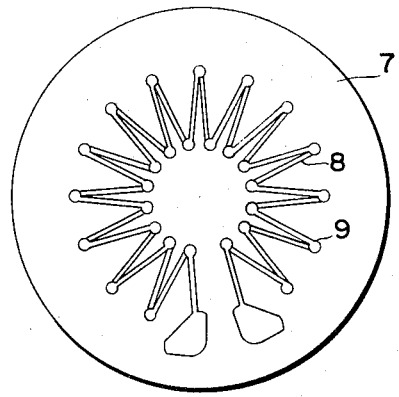
FIG. 3 is a plan view showing one example of a temperature measuring body according to the present invention.

FIG. 3 illustrates, as an example, a plan of a group of differential thermocouples made by vacuum plating. Thin layer 8 of Alumel and thin layer 9 of Chromel are formed on the surface of an electrically insulating thin plate 7, forming 14 pairs of temperature sensing points.

Figure 4:
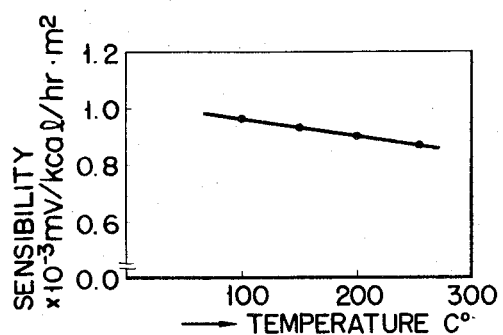
FIG. 4 is a sensibility characteristic diagram showing one example of the measurement result of the sensibility characteristic of a heat flow meter according to the present invention.

FIG. 4 shows an example of sensibility characteristic of a heat flow meter constructed as shown in FIG. 1. In this embodiment, aluminum alloy of 0.8 mm in thickness is used for metal plates 1 and 2 and 28 pieces of Alumel-Chromel thermocouples of about 50 microns in thickness are differentially connected in series to serve as a thermocouple element, the air layer of about 200 microns in thickness working as a thermally resistant body 5. The sensibility of a heat flow meter of such construction was measured and the resulting data are given in the diagram shown in FIG. 4. As apparent from the diagram, the sensibility characteristic is dependent to some extent on temperature; however, the quantity of heat flow can be measured with a sufficient accuracy using a calibration curve.

The above data pertain to a heat flow meter which is relatively thick and also thick in air layer but somewhat dependent on temperature, although its sensibility is high. However, by reducing the thickness it is possible to obtain a heat flow meter excellent in that the temperature dependency is slight and thermal turbulence does not appear in the measured body, although its sensibility is somewhat low.

What is claimed is:

1. A heat flow meter comprising:
   a thin flat plate of good thermal conductivity having shallow depressions in one surface thereof, said depressions being filled with material of poor thermal conductivity, and
   a temperature measuring means adjacent said plate and positioned to measure the difference between the temperature drop through said material of poor thermal conductivity and through the adjacent areas of said plate of good thermal conductivity when a heat current passes through said plate.

2. A heat flow meter as described in claim 1 wherein said thermally resistant material is air.

3. A heat flow meter comprising:
   two thin plates of good thermal conductivity, said plates having shallow depressions in one surface thereof, said plates being so arranged that said surfaces face each other, said depressions being filled with material of poor thermal conductivity; and
   a thin differential thermocouple fixed on the same plane between said two thin plates and separated therefrom by thin electrically insulating material, said plates being so arranged with respect to each other that said depressions are out of registration, the temperature sensing points of said thermocouple being so arranged as to form pairs over the area extending from said thermally resistant material to the adjacent good thermally conducting material.

4. A heat flow meter as described in claim 3 wherein said thermally resistant material is air.

5. A heat flow meter comprising:
a first thin plate of good heat conducting material provided with shallow depressions in one face thereof;
a second thin plate of other good heat conducting material so arranged as to face in closely spaced relationship the depressed surface of said first thin plate;
thermally resistant material filled in said depressions;
a thin differential thermocouple fixed on the same plate between said two thin plates and separated from said plates by thin electrically insulating material, said thermocouple being so arranged that temperature sensing points form pairs over the area extending from said thermally resistant material to the good heat conducting material adjacent thereto.

6. A heat flow meter as described in claim 5 wherein said thermally resistant material is air.

* * * * *